United States Patent [19]

So

[11] Patent Number: 5,744,912
[45] Date of Patent: Apr. 28, 1998

[54] ELECTRONIC BALLAST HAVING AN OSCILLATOR SHUTDOWN CIRCUIT FOR SINGLE OR MULTIPLE FLUORESCENT TUBES FOR LAMPS

[76] Inventor: Gin Pang So, 2, Macrill Rd., Markham, Ontario, Canada, L6C 1R3

[21] Appl. No.: 669,784

[22] Filed: Jun. 26, 1996

[51] Int. Cl.$^6$ .................................................. H05B 37/00
[52] U.S. Cl. .................. 315/127; 315/225; 315/209 R; 315/224; 315/307; 315/DIG. 7
[58] Field of Search .................... 315/127, 209 R, 315/224, 225, 247, 219, 238, 306, 307, 362, DIG. 5, DIG. 7

[56] References Cited

U.S. PATENT DOCUMENTS

| | | | |
|---|---|---|---|
| 4,535,271 | 8/1985 | Holmes | 315/209 R |
| 5,065,074 | 11/1991 | Hesketh et al. | 315/209 R |
| 5,204,587 | 4/1993 | Mortimer et al. | 315/308 |
| 5,315,214 | 5/1994 | Lesea | 315/209 R |
| 5,387,846 | 2/1995 | So | 315/209 R |
| 5,550,436 | 8/1996 | Houk | 315/209 R |

*Primary Examiner*—Robert Pascal
*Assistant Examiner*—Haissa Philogene
*Attorney, Agent, or Firm*—Morland C. Fischer

[57] ABSTRACT

An electronic ballast having particular application for driving small diameter fluorescent tubes or lamps (such as the T2, T4 and T5 sizes). The electronic ballast has a shutdown circuit by which to remove power to the oscillator when the tube or lamp is close to the end of its useful life or when an abnormal condition occurs such that a rise in operating voltage is detected. The shutdown circuit detects the rise in the operating voltage of the tube or lamp and energizes a relay through the conduction path of a photoresponsive transistor that is rendered conducting by a light emitting diode. The relay directs power away from the oscillator and towards the control electrode of the photoresponsive transistor to hold the phototransistor on and thereby disable the ballast. The ballast also includes a power factor controller to provide a high power factor and a more efficient operation.

18 Claims, 2 Drawing Sheets ions for electronic ballast...

ELECTRONIC BALLAST HAVING AN OSCILLATOR SHUTDOWN CIRCUIT FOR SINGLE OR MULTIPLE FLUORESCENT TUBES FOR LAMPS

BACKGROUND OF THE INVENTION

1. Field of the Invention

This invention relates to an electronic ballast having particular application for driving small diameter fluorescent tubes or lamps, such as the T2, T4 and T5 sizes, and including a shutdown circuit by which to remove power to the oscillator when the tube or lamp is close to or at the end of its useful life or when an abnormal condition occurs (e.g. an excessive operating temperature, a defective tube, and the like).

2. Background Art

Many small diameter fluorescent tubes and lamps (e.g. T2, T4 and T5 sizes) are known to experience excessively high increases in temperature due to the increase in lamp voltage and/or current as the lamp approaches the end of its useful life. More particularly, a characteristic of such tube/lamp is to develop an extremely high temperature (approximately 350 degrees C.) on the exterior surface or wall thereof when operating under an abnormal condition and especially at the end of its life.

Should the tube/lamp continue to operate at high temperature for a long period of time, the tube/lamp base and/or socket and/or fixture may become susceptible to melting or burning. Furthermore, it is possible that sustained operation at these high temperatures will cause the glass wall of the tube/lamp to crack and/or melt with the result that molten glass particles will fall free from the tube/lamp. Consequently, there exists a risk of fire and the loss associated therewith.

Accordingly, what is needed is an electronic ballast having a reliable, fast-acting shutdown circuit whereby to disable the oscillator and terminate tube/lamp operation whenever such tube or lamp operates under an abnormal condition that is accompanied by a significant increase in temperature. It would also be desirable that such ballast be suitable for use with a small diameter tube/lamp, inasmuch as commercially available electronic ballasts are commonly not designed to respond to such anomalies, particularly those occurring in small diameter tubes and lamps.

SUMMARY OF THE INVENTION

In general terms, an electronic ballast is disclosed for driving single or multiple fluorescent tubes or lamps, regardless of manufacture, particularly small diameter lamps such as the T2 (0.25 inches), the T4 (0.5 inches) and the T5 (0.625 inches). The electronic ballast includes a reliable shutdown circuit that is responsive to increases in voltage that are typical in a tube or lamp operating under an abnormal condition, particularly at the end of its useful life. The shutdown circuit herein described is adapted to insure reliable and safe control of all lamp operating modes in order to prevent overheating and the possibility of fire in the event that an abnormal operating condition is sensed.

The electronic ballast includes an input filter to reduce the RF interference of the input power and a high power factor DC power supply that receives the filtered input power. Output voltage from the DC power supply is provided via a relay switch arm to drive the ballast oscillator having the usual pair of transistors operating in a push-pull fashion. A relay for controlling the relay switch arm is connected to an optoisolator having a photoresponsive transistor and a light emitting diode. The photoresponsive transistor of the optoisolator is connected between the output of the DC power supply and the relay switch arm via the relay. The LED of the optoisolator is connected between a winding of the ballast transformer and a transistor trigger switch which is adapted to trigger shutdown of the oscillator in response to an increased operating voltage. Voltage for a first fluorescent tube/lamp is supplied thereto from the ballast transformer via a first diode bridge rectifier, and voltage for a second fluorescent tube/lamp is supplied from the ballast transformer via a second diode bridge rectifier.

In operation, when the fluorescent tubes/lamps operate within an acceptable range of voltages, the transistor trigger switch is rendered non-conducting and the shutdown operation will not be triggered. However, should the operating voltage of one fluorescent tube/lamp increase as a consequence of an abnormal operating condition (e.g. the end of its life), the transistor trigger switch will be rendered conducting by the increased voltage to establish a current path through the light emitting diode of the optoisolator. The light emitting diode will now light and the photoresponsive transistor of the optoisolator will be correspondingly rendered conducting to establish a current path from the DC power supply to the relay. The relay is then energized and the relay switch arm is accordingly switched from a first switch contact to a second switch contact to interrupt power to the oscillator transistors and thereby shutdown the ballast. More particularly, a current path is established from the output of the DC power supply to the base of the photoresponsive transistor via the switch arm engaging the second switch contact to hold the photoresponsive transistor in a conducting state until input power is turned off and the photoresponsive transistor is reset.

DETAILED DESCRIPTION

Figure 1:
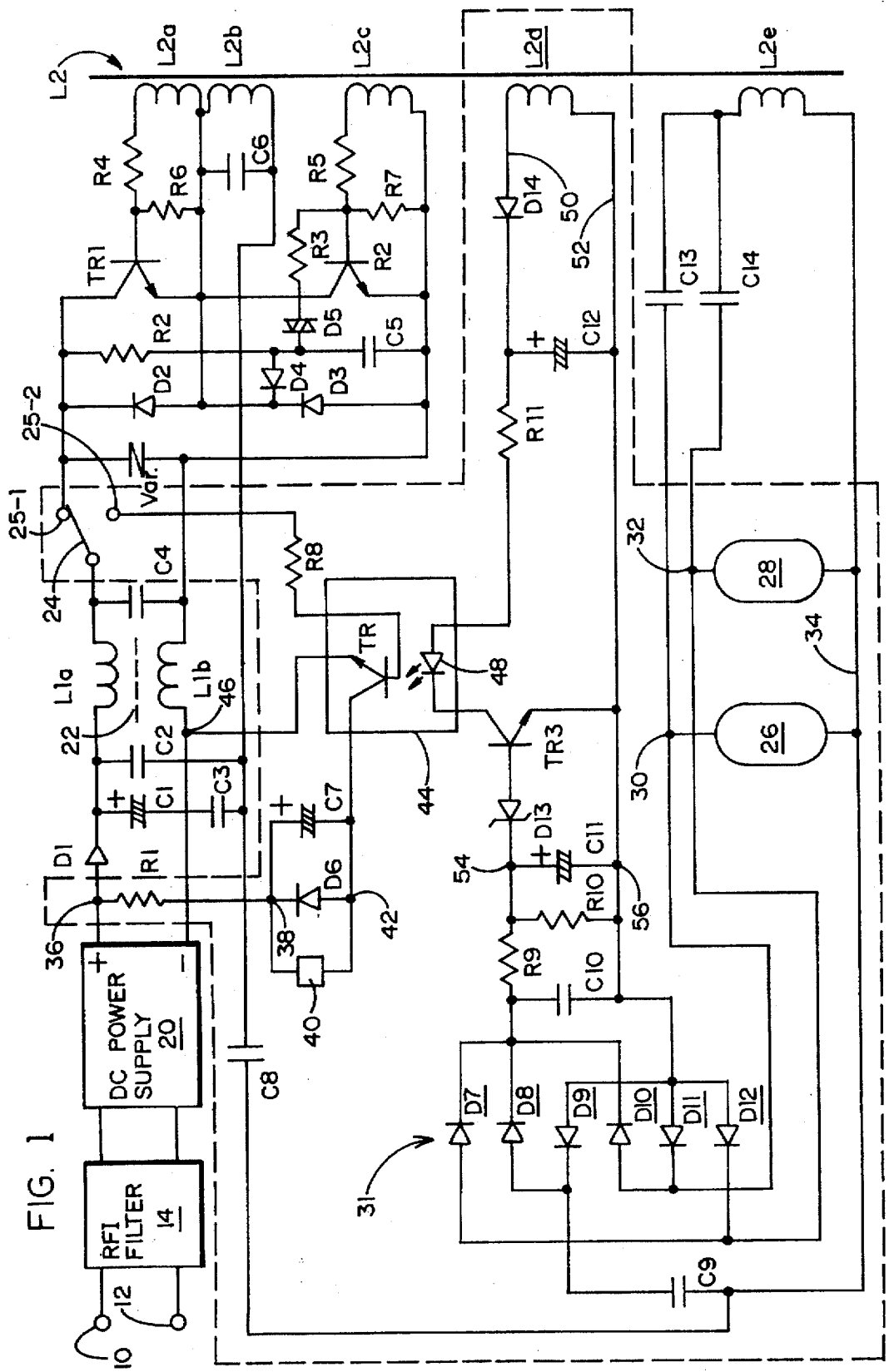
FIG. 1 is a schematic of the electronic ballast which forms the present invention having a unique shutdown circuit for single or multiple fluorescent tubes or lamps.

In accordance with a first embodiment of the present invention, and referring to FIG. 1 of the drawings, an electronic ballast is disclosed to power one or more fluorescent tubes or lamps, especially small diameter sizes T2, T4 and T5. The ballast includes a pair of AC power input terminals 10 and 12 that are connected to the input of a RFI filter 14. The output of RFI filter 14 is connected to the input of a high power factor DC power supply 20. An electrolytic capacitor C1 is connected across the output terminals of the DC power supply 20 following a diode D1, such that one plate of capacitor C1 is connected to the cathode of diode D1. Capacitor C1 functions to smooth the DC voltage provided by the DC power supply 20 to drive the oscillator of the ballast.

That is to say, DC voltage is supplied from the output of power supply 20 to a high frequency ferrite choke 22 having a pair of coils L1a and L1b. The coils L1a and L1b are wound in opposite directions such that the choke 22 is adapted to limit the amount of high frequency current passing therethrough. A capacitor C4 that is connected in parallel with electrolytic capacitor C1 is connected between the high frequency choke 22 and a relay switch arm 24. As will soon be described, the relay switch arm 24 is adapted to be switched from a first relay contact 25-1 so as to communicate with the oscillator trigger circuit to a second relay contact 25-2 so as to communicate with an optoisolator 44 for an important purpose that will be disclosed in greater detail hereinafter.

The aforementioned oscillator trigger circuit is interconnected with the DC power supply 20 via choke 22 when the relay switch arm 24 engages relay contact 25-1 as shown in FIG. 1. In this case, the trigger circuit is adapted to drive the usual high frequency oscillator of the ballast. More particularly, the trigger circuit includes the series connection of a resistor R2 and a trigger capacitor C5. The series connection of resistor R2 and capacitor C5 is connected across the connector-emitter paths of a pair of oscillator transistors TR1 and TR2. The anode of a diode D4 and one electrode of a diac D5 are connected together at a common electrical junction between the series connected resistor R2 and the trigger capacitor C5. A resistor R3 is connected in series between the opposite electrode of the diac D5 and the base of one of the oscillator transistors TR2.

The high frequency oscillator, which is controlled by the aforementioned trigger circuit and a power output circuit, includes the oscillator transistors TR1 and TR2. The base of oscillator transistor TR1 is connected in a feedback path with the emitter of transistor TR1 via the parallel connection of a resistor R6 and a first winding L2a of an oscillation and power output transformer L2. The base of transistor TR2 is connected in a feedback path with the emitter of transistor TR2 via the parallel connection of a resistor R7 and a second winding L2c from the oscillator and power output transformer L2. As indicated above, trigger resistor R3 is connected between diac D5 and the base of oscillator transistor TR2 at a common electrical junction with feedback resistor R7.

The output circuit of the electronic ballast FIG. 1 also includes a third transformer winding L2b. One terminal of winding L2b is connected to one plate of an output capacitor C6, while the opposite terminal of winding L2b is connected to the second plate of output capacitor C6 at a common electrical junction with one terminal of the feedback resistor R6, feedback transformer winding L2a, and the emitter of oscillator transistor TR1. Current from oscillator transistors TR1 and TR2 passes through winding L2b to be fed back to the bases of transistors TR1 and TR2 to initiate oscillator operation.

A first current limiting capacitor C13 is connected between one terminal of a fourth transformer winding L2e and a common electrical junction 30 with one terminal of a first fluorescent tube or lamp 26 and a diode bank 31 at which a pair of soon-to-be described diode rectifier bridges are formed. A second current limiting capacitor C14 is connected between the first terminal of transformer winding L2e and a common electrical junction 32 with one terminal of a second fluorescent tube or lamp 28 and the diode bank 31. The second terminal of transformer winding L2e is connected at a common electrical junction 34 with the second terminals of each of the first and second fluorescent tubes or lamps 26 and 28 and one plate of a capacitor C9. The second plate of the capacitor C9 is connected to the diode bank 31 and to each of the diode rectifier bridges included therein. During ballast operation, and depending upon the type and characteristics of the fluorescent tubes or lamps in use, transformer winding L2e will supply voltages (typically 300 to 800 volts) at high frequency (e.g. 22 to 30 KHz) so that the high frequency voltage can be tuned to suit the starting voltage requirements of the fluorescent tubes/ lamps.

A resistor R1 is connected between a common electrical junction 36 formed with the positive output terminal of DC power supply 20 and the anode of diode D1 and a common electrical junction 38 formed with one terminal of a relay 40, the cathode of a back biased diode D6 and one plate of an electrolytic capacitor C7. The second plate of capacitor C7, the anode of diode D6 and the second terminal of relay 40 are all connected together at a common electrical junction 42, such that relay 40, diode D6 and capacitor C7 are connected in electrical parallel. The aforementioned connection of resistor R1 and diode D6 enables the ballast to consume minimum power and increase power loss efficiency.

The relay 40 is adapted to control the position of relay switch arm 24 between relay contacts 25-1 and 25-2 by which the power supply 20 is interconnected with either the oscillator trigger circuit or the optoisolator 44. To this end, the aforementioned common electrical junction 42 is connected to the optoisolator 44 (e.g. an integrated circuit) including a photoresponsive transistor TR and a light emitting diode (LED) 48. More particularly, common electrical junction 42 is connected to the collector of photoresponsive transistor TR. The emitter of transistor TR is connected to a common electrical junction 46 with the negative output terminal of DC power supply 20 and the coil L1b of the high frequency choke 22. The base of transistor TR of optoisolator 44 is connected via a current limiting resistor R8 to the relay switch contact 25-2.

LED 48 of optoisolator 44 is located in proximity to the photoresponsive transistor TR so that the conductivity of transistor TR is dependent upon the light emission of LED 48. Therefore, the anode of LED 48 is connected (via a resistor R11 and a diode D14) to one terminal 50 of a fifth transformer winding L2d such that LED 48 is adapted to receive current through a current supply path comprising winding L2d, diode D14 and resistor R11. The cathode of LED 48 is connected to the collector of a transistor trigger switch TR3 that controls the energization of LED 48 and, hence, the conductivity of photoresponsive transistor TR. The emitter of transistor trigger switch TR3 is connected to a second terminal 52 of transformer winding L2d so that when transistor TR3 is switched on, a portion of the current that is supplied to LED 48 will be returned to terminal 52 of transformer winding L2d via the collector-emitter conduction path of transistor trigger switch TR3.

The anode of a Zener diode D13 is connected to the base of transistor trigger switch TR3. The cathode of Zener diode D13 is connected to a common electrical junction 54 with one plate of an electrolytic capacitor C11 and first terminals of respective resistors R9 and R10. Electrolytic capacitor C11 and resistor R10 are connected in electrical parallel with one another and with a smoothing capacitor C10. In this regard, one plate of smoothing capacitor C10, the second plate of electrolytic capacitor C11 and the second terminal of resistor R10 are connected together at a common electrical junction 56 that is also common to the second terminal 52 of transformer winding L2d. Therefore, a current path will be established through the collector-emitter conduction path of the transistor trigger switch TR3 when transistor TR3 is switched on so that DC current can be returned to the base of transistor trigger switch TR3 via the bridge rectifiers of diode bank 31 depending upon the operating condition (i.e. life expectancy) of fluorescent tubes or lamps 26 and 28.

The operation of the electronic ballast of FIG. 1 is now described in detail. When AC power is applied to the input terminals 10 and 12 of the ballast and the oscillator transistors TR1 and TR2 are driven in a well known push-pull fashion to establish conventional oscillator operation, the transformer winding L2e develops a high frequency voltage to start each of the fluorescent tubes or lamps 26 and 28. More particularly, the voltage for causing tube or lamp 26 to fire is applied across electrical junctions 30 and 34 via capacitor C9 and a first of the diode bridge rectifiers from diode bank 31 comprising diodes D8, D9, D10 and D11. At the same time, the voltage for causing tube or lamp 28 to fire is applied across electrical junctions 32 and 34 via capacitor C9 and the second diode bridge rectifier from diode bank 31 comprising diodes D7, D8, D9 and D12.

It is important to recognize that a total of six diodes from the diode bank 31 form the aforementioned first and second diode bridge rectifiers, such that some of the diodes (e.g. D8 and D9) from bank 31 are shared by both diode bridge rectifiers. It may also be appreciated that the number of diodes which form the bank 31 will increase as the number of fluorescent tubes or lamps increases.

The two DC voltages produced by the first and second diode bridge rectifiers of diode bank 31 are smoothed by capacitor C10 and passed through resistors R9 and R10 (which function as a voltage divider) to establish a DC voltage across electrolytic capacitor C11 between electrical junctions 54 and 56. When the tubes or lamps 26 and 28 operate within a range of normal voltages, the DC voltage at electrical junction 54 will not exceed the allowable breakdown voltage of Zener diode D13. Hence, Zener diode D13 will be back-biased in a non-conducting state so that the tube/lamp shutdown operation will not be triggered.

However, should the operating voltage of either one of the tubes or lamps 26 and 28 increase as a consequence of reaching the end of its useful life, such voltage at electrical junction 54 will be high enough to exceed the breakdown voltage of Zener diode D13. Accordingly, Zener diode D13 will now be forward-biased in a conducting state such that the DC voltage at electrical junction 54 will pass through Zener diode D13 and a DC current (having transformer winding L2e as its energy source) will be applied to the base of transistor trigger switch TR3 via resistor R9 and Zener diode D13 by which to trigger the shutdown operation of the tubes/lamps 26 and 28. In this regard, the DC voltage applied to the base of transistor trigger switch TR3 from electrical junction 54 will cause the transistor TR3 to be rendered conducting and establish a current path through transistor TR3 and the LED 48 of optoisolator 44, whereby to cause LED 48 to light and the photoresponsive transistor TR of optoisolator 44 to be rendered conducting.

Current from DC power supply 20 will now flow from the positive output terminal 36 thereof through resistor R1, the relay 40, and the collector-emitter path of photoresponsive transistor TR to the electrical junction 46 with coil L1b of the transformer 22. At this time, the relay 40 is energized so as to cause relay switch arm 24 to switch from relay contact 25-1 to relay contact 25-2. This switching action will interrupt the DC power to the oscillator transistors TR1 and TR2 and thereby terminate the operation of the oscillator of the ballast.

Thus, DC current will now flow from terminal 50 of transformer winding L2d to terminal 52 thereof via a current path comprising diode D14, resistor R11, LED 48 and trigger switch transistor TR3. Moreover, DC current will also flow to the base of the photoresponsive transistor TR of optoisolator 44 via relay switch arm 24 and resistor R8 for causing transistor TR to remain in a conducting state until the input power to the ballast at input terminals 10 and 12 is turned off, at which time the photoresponsive transistor TR of optoisolator 44 will be reset.

By virtue of the improved ballast circuit shown in FIG. 1 and described immediately above, tube/lamp shutdown will not occur and the oscillator operation will not be terminated until the lamp voltage increases to a particular threshold level corresponding to the breakdown voltage of Zener diode D13. It may also be appreciated that a pair of diode bridge rectifiers (i.e. comprising diodes D8, D9, D10, D11 and D7, D8, D9, D12) accurately sense the respective output voltages (including both DC and AC voltages that flow in positive and/or negative directions) of the tubes/lamps 26 and 28. It might be noted that as a lamp 26 or 28 approaches the end of its life, the gas in the lamp may itself cause a rectifier effect thereby producing high DC or AC voltages. What is more, the optoisolator 44 isolates the source of DC power from the high frequency output so as to advantageously avoid RF interference therebetween and thereby permit lamp/tube shutdown to occur accurately and efficiently.

Figure 2:
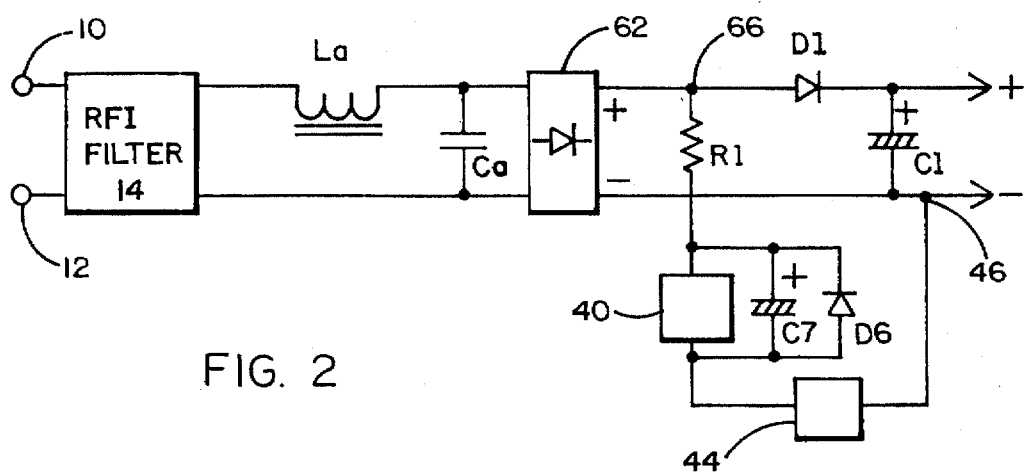
FIG. 2 shows a first modification to the ballast of FIG. 1.

FIG. 2 of the drawings shows a first modification to the electronic ballast of FIG. 1. In the ballast of FIG. 2, an iron choke La and a capacitor Ca are connected between the radio frequency interference filter 14 and a diode bridge rectifier 62. More particularly, iron choke La is connected to one of the output terminals of filter 14 and capacitor Ca is connected in electrical parallel across rectifier 62. Resistor R1 is connected between the positive output terminal 66 of diode bridge rectifier 62 and the relay 40 so that DC current will be supplied to optoisolator 46 to achieve oscillator shutdown in the manner that was described above with regard to the electronic ballast of FIG. 1.

Iron choke La and capacitor Ca form a power factor controller so as to increase the power factor and decrease the harmonic distortion of the input current. That is, the AC voltage across the capacitor Ca will be approximately 110 to 120 percent of the voltage applied at power input terminals 10 and 12. At electrical junction 66 (where resistor R1 is connected to the positive output terminal of diode bridge rectifier 62) the DC rms voltage is approximately equal to the voltage across capacitor Ca, while the DC voltage across electrolytic capacitor C1 is increased to approximately 1.4 times the voltage across capacitor Ca. Current to operate the relay 40 (which controls the relay switch arm 24 shown in FIG. 1) is derived from the resistor R1. In this regard, by powering relay 40 from resistor R1, less total power is consumed while heat dissipation is reduced.

Figure 3:
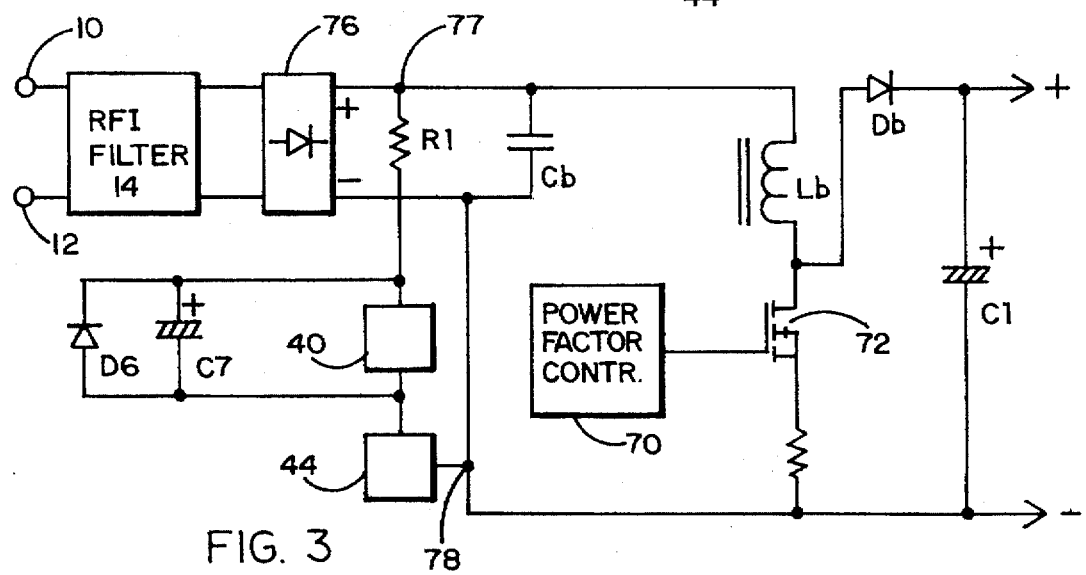
FIG. 3 shows a second modification to the ballast of FIG. 1.

FIG. 3 of the drawings shows a second modification to the electronic ballast of FIG. 1. In this case, a commercially available power factor controller 70 is used to provide a high power factor in place of the power factor controller that is formed from the capacitor Ca and the iron choke La of FIG. 2. By way of example, known integrated circuits which are suitable power factor controllers for use in this modification are available from Motorola Corporation under Model Nos. MC34262 and MC33262. However, the precise location of the power factor controller 70 in the electronic ballast shown in FIG. 3 is believed to be unique.

That is, the power factor controller 70 is connected to the control electrode of a discrete power MOS transistor 72. The power factor controller 70 drives the power transistor 72 so as to implement active power factor correction for sinusoidal line current consumption. The series connection of power transistor 72 with an iron choke Lb is connected in electrical parallel with the electrolytic capacitor C1 and across the output terminals of diode bridge rectifier 76.

Figure 4:
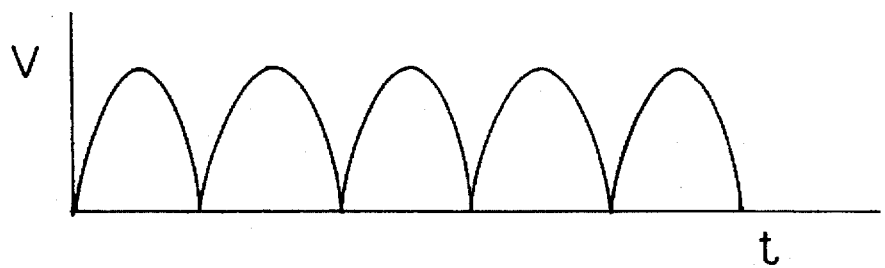
FIG. 4 shows a waveform that is indicative of the operation of the modified ballast of FIG. 3.

The power input, after passing through the radio frequency interference filter 14 and the diode bridge rectifier 76, will reach the common electrical junction 77 formed by the resistor R1 and the positive output terminal of bridge rectifier 76 such that the voltage at electrical junction 77 is approximately equal to the voltage applied to power input terminals 10 and 12. The electrical waveform at each of the electrical junctions 77 and 78 (i.e. connected to optoisolator 44) is illustrated in FIG. 4 of the drawings. The relay 40 is connected to the resistor R1 to receive current therethrough so as to conserve power during such times that the shutdown circuit is activated.

The electronic ballast herein disclosed is characterized as being lightweight, energy efficient and of relatively low manufacturing cost. Moreover, the ballast is capable of a high power factor, low total harmonic distortion and minimal radio frequency interference. The shutdown circuit is adapted to insure reliable and safe control of all lamp operating modes in order to prevent overheating and the possibility of fire in the event that the fluorescent tube or lamp has reached the end of its useful life or the tube/lamp is defective or is otherwise being operated under an abnormal condition.

It will be apparent that while a preferred embodiment of the invention has been shown and described, various modifications and changes may be made without departing from the true spirit and scope of the invention.

Having thus set forth the preferred embodiment, what is claimed is:

1. An electronic ballast to power at least one fluorescent tube or lamp, said ballast including a source of power, a DC power supply having an input connected to said source of power, an oscillator connected to an output of said DC power supply so as to be driven therefrom, and a shutdown circuit to disable said oscillator and shutdown said electronic ballast in the event that the at least one fluorescent tube or lamp operates abnormally, said shutdown circuit comprising means responsive to the operating voltage of the at least one fluorescent tube or lamp, and photoresponsive switch means being controlled by said operating voltage responsive means to disconnect said oscillator from said DC power supply and thereby disable said oscillator when the operating voltage of the at least one fluorescent tube or lamp exceeds a particular threshold level.

2. The electronic ballast recited in claim 1, said shutdown circuit further comprising a relay and a relay switch arm, the energization of said relay being controlled by said photoresponsive switch means for causing said relay switch arm to switch from a first relay contact at which said DC power supply is connected to said oscillator to a second relay contact at which said DC power supply is disconnected from said oscillator.

3. The electronic ballast recited in claim 2, wherein said photoresponsive switch means is a light sensitive transistor having a control electrode and a conduction path, said light sensitive transistor rendered conducting in response to the emission of light in proximity thereto.

4. The electronic ballast recited in claim 3, wherein said relay is connected in a DC current path between the output of said DC power supply and the conduction path of said light sensitive transistor for causing said switch arm to switch from said first relay contact to said second relay contact when said light sensitive transistor is rendered conducting.

5. The electronic ballast recited in claim 4, wherein said relay is connected in electrical parallel with a unidirectional current conducting device that is biased so as to block the flow of DC current therethrough from said DC power supply, said DC current path including a resistor connected between the output of said DC power supply and the parallel connection of said relay with said unidirectional current conducting device.

6. The electronic ballast recited in claim 3, wherein the control electrode of said light sensitive transistor is interconnected with the output of said DC power supply via said relay switch arm when said relay switch arm is switched to said second relay contact.

7. The electronic ballast recited in claim 3, wherein said means responsive to the operating voltage of the at least one fluorescent tube or lamp includes a shutdown triggering transistor having a control electrode and a conduction path, said shutdown triggering transistor rendered conducting whenever the operating voltage of the at least one fluorescent tube or lamp exceeds said particular threshold level.

8. The electronic ballast recited in claim 7, wherein said means responsive to the operating voltage of the at least one fluorescent tube or lamp also includes a Zener diode connected to the control electrode of said shutdown triggering transistor, said Zener diode rendered conducting when the operating voltage of the at least one fluorescent tube or lamp exceeds said particular threshold level for applying said operating voltage to the control electrode of said shutdown triggering transistor to cause said shutdown triggering transistor to be rendered conducting.

9. The electronic ballast recited in claim 8, also including a diode bridge rectifier connected to the control electrode of said shutdown triggering transistor via said Zener diode.

10. The electronic ballast recited in claim 9, wherein the at least one fluorescent tube or lamp is connected between said diode bridge rectifier and a voltage source, said voltage source supplying high frequency voltage to start the at least one fluorescent tube or lamp, and said diode bridge rectifier sensing said high frequency voltage for providing a corresponding voltage to said Zener diode.

11. The electronic ballast recited in claim 8, wherein a pair of fluorescent tubes or lamps are powered by said electronic ballast, the pair of fluorescent tubes or lamps being connected between respective diode bridge rectifiers and a voltage source, said respective diode bridge rectifiers sharing at least one diode that is common to each of said diode bridge rectifiers and said voltage source supplying high frequency voltage to start the pair of fluorescent tubes or lamps, said respective diode bridge rectifiers sensing said supply of high frequency voltage to the pair of fluorescent tubes or lamps for providing corresponding voltages to said Zener diode.

12. The electronic ballast recited in claim 7, wherein said shutdown circuit also comprises a light emitting diode that is located in proximity to said light sensitive transistor and is adapted to emit light to thereby cause said light sensitive transistor to be rendered conducting whenever the operating voltage of the at least one fluorescent tube or lamp exceeds said particular threshold level and said shutdown triggering transistor is rendered conducting.

13. The electronic ballast recited in claim 12, wherein said light emitting diode is connected in electrical series with the conduction path of said shutdown triggering transistor such that said light emitting diode emits light to cause said light sensitive transistor to be rendered conducting when said shutdown triggering transistor is rendered conducting.

14. The electronic ballast recited in claim 1, also including means to maximize the power factor of said ballast comprising an iron choke connected between said source of power and said DC power supply and a capacitor connected across the input of said DC power supply.

15. The electronic ballast recited in claim 1, also including means to maximize the power factor of said ballast comprising the series connection of an iron choke with a power MOS transistor, said series connection positioned across the output of said DC power supply, and a power factor controller to drive said power MOS transistor.

16. An electronic ballast to power at least one fluorescent tube or lamp, said ballast including a source of power, a DC power supply having an input connected to said source of power, an oscillator connected to an output of said DC power supply so as to be driven therefrom, and a shutdown circuit to disable said oscillator and shut down said electronic ballast in the event that the at least one fluorescent tube or lamp operates abnormally, said shutdown circuit comprising a light sensitive switch that is closed in response to the emission of light in proximity thereto, and a shutdown triggering transistor that is responsive to the operating voltage of the at least one fluorescent tube or lamp, said shutdown triggering transistor rendered conducting whenever the operating voltage of the at least one fluorescent tube or lamp exceeds a particular threshold level for causing light to be emitted and said light sensitive switch to be closed for disconnecting said oscillator from said DC power supply and thereby disabling said oscillator.

17. The electronic ballast recited in claim 16, wherein said shutdown circuit also comprises a light emitting diode that is connected in electrical series with said shutdown triggering transistor, said light emitting diode located in proximity to said light sensitive switch and adapted to emit light to thereby cause said light sensitive switch to close whenever the operating voltage of the at least one fluorescent tube or lamp exceeds said particular threshold level and said shutdown triggering transistor is rendered conducting.

18. The electronic ballast recited in claim 17, wherein said light sensitive switch is a light sensitive transistor that is rendered conducting in response to the light emitted by said light emitting diode, said shutdown circuit further comprising a relay that is connected to said light sensitive transistor and adapted to disconnect said oscillator from said DC power supply when the operating voltage of the at least one fluorescent tube or lamp exceeds said particular threshold level and both of said light sensitive transistor and said shutdown triggering transistor are rendered conducting.

* * * * *